(12) United States Patent
Pedemonte

(10) Patent No.: US 6,319,291 B1
(45) Date of Patent: Nov. 20, 2001

(54) NAVY-BLUE DYE MIXTURE OF FIBER-REACTIVE AZO DYES

(75) Inventor: Ronald P. Pedemonte, Eppstein-Vockenhausen (DE)

(73) Assignee: DyStar Textilfarben GmbH & Co., Deutschland KG (DE)

( * ) Notice: Subject to any disclaimer, the term of this patent is extended or adjusted under 35 U.S.C. 154(b) by 0 days.

(21) Appl. No.: 09/492,099

(22) Filed: Jan. 27, 2000

Related U.S. Application Data

(62) Division of application No. 09/120,009, filed on Jul. 21, 1998, now abandoned.

(51) Int. Cl.$^7$ .............................. D06P 1/382; D06P 1/384; C09B 67/24
(52) U.S. Cl. ........................................ 8/549; 8/641; 8/918
(58) Field of Search .................................. 8/549, 641, 918

(56) References Cited

U.S. PATENT DOCUMENTS

| | | | |
|---|---|---|---|
| 5,611,821 | 3/1997 | Huang et al. | 8/549 |
| 5,849,887 | 12/1998 | Lehmann et al. | 534/642 |

FOREIGN PATENT DOCUMENTS

| | | |
|---|---|---|
| 785 237 | 1/1997 | (EP) . |
| 870 807 | 10/1998 | (EP) . |
| 37977 | 6/1990 | (KR) . |
| 94-2560 | 3/1994 | (KR) . |

OTHER PUBLICATIONS

Judgment Pursuant to 37 CFR § 1.617 regarding Patent Interference No. 104,480; Feb. 22, 2000.

*Primary Examiner*—Margaret Einsmann
(74) *Attorney, Agent, or Firm*—Connolly Bove Lodge & Hutz LLP

(57) ABSTRACT

The present invention relates to dye mixtures comprising one or more disazo dyes conforming to the formula (1) and one or more monoazo dyes corforming to the formula (2)

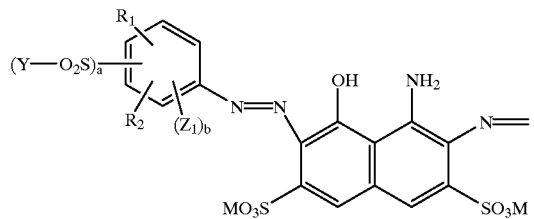

(1)

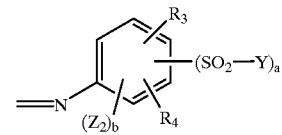

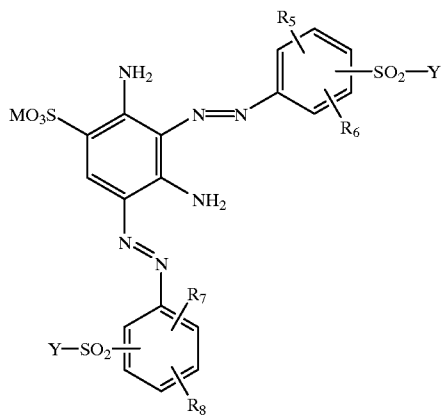

(2)

wherein the variables are described in the specification.

12 Claims, No Drawings

NAVY-BLUE DYE MIXTURE OF FIBER-REACTIVE AZO DYES

This application is a divisional of U.S. application Ser. No. 09/120,009 filed Jul. 21, 1998, now abandoned.

The present invention relates to the field of fiber-reactive dyes. It describes navy-blue dye mixtures of fiber-reactive azo dyes and use thereof for dyeing hydroxy- and/or carboxamido-containing fiber material.

The present invention provides a dye mixture comprising one or more disazo dyes conforming to the formula (1) and one or more monoazo dyes conforming to the formula (2)

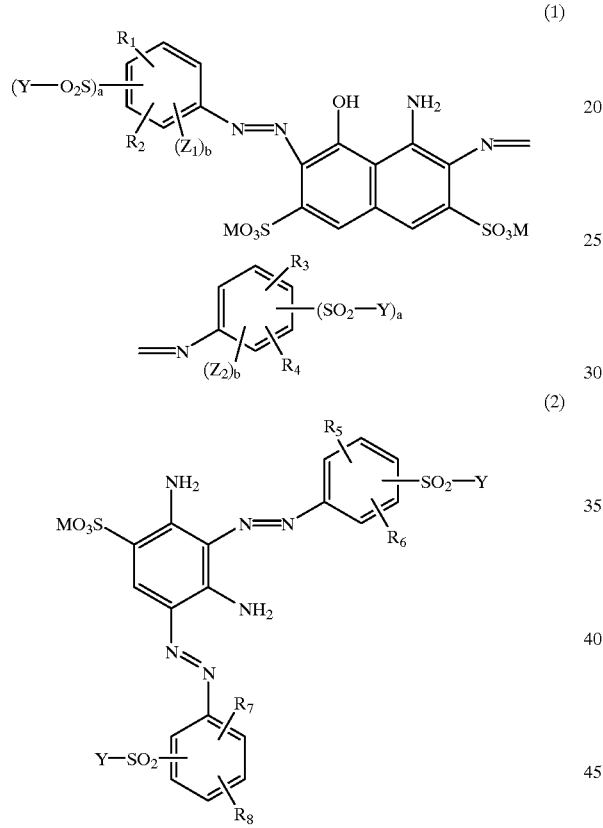

wherein $R_1$, $R_2$, $R_3$ and $R_4$, identical to or different from each other, are each hydrogen, methyl, ethyl, methoxy, ethoxy, sulfo or carboxy, $R_5$, $R_6$, $R_7$ and $R_8$, identical to or different from each other, are each hydrogen, methyl, ethyl, methoxy or ethoxy, Y is in each instance independently of the others vinyl, β-chloroethyl, β-thiosulfatoethyl or β-sulfatoethyl, a is the number 0 or 1, b is the number 0 or 1, M is hydrogen or an alkali metal, $Z_1$ and $Z_2$ are independently selected from the fiber-reactive groups of the formulae (3a), (3b), (3c), (3d) and (3e).

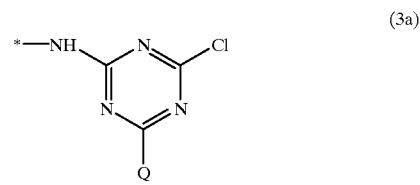

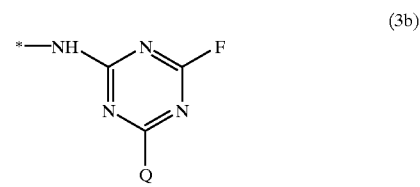

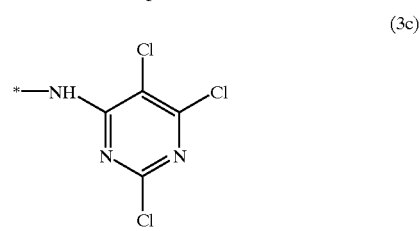

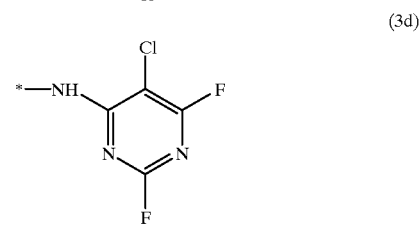

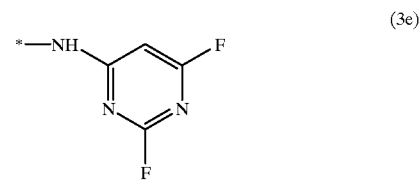

where Q is chloro, cyanamido, hydroxy, alkoxy of 1 to 4 carbon atoms, phenoxy, sulfophenoxy, pyridino, carboxypyridino, carbamoylpyridino or a group of the general formulae (4a) or (4b),

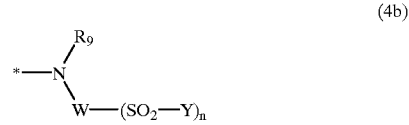

wherein $R_9$ is hydrogen, alkyl of 1 to 4 carbon atoms, cyclohexyl, alkoxy of 1 to 4 carbon atoms, hydroxyalkyl of 2 to 4 carbon atoms, sulfoalkyl of 1 to 4 carbon atoms, phenyl unsubstituted or substituted by 1 to 2 substituents selected from the group of substituents consisting of chlorine, bromine, methyl, ethyl, methoxy, sulfo and carboxy, or is monosulfonaphthyl, disulfonaphthyl, alkyl of 2 to 6 carbon atoms substituted by phenyl, the alkyl moiety may be interrupted by a hetero group selected from O, S, NH, $SO_2$, CO, CO—NH or NH—CO, and the phenyl substituent thereof may be substituted by 1 to 2 substituents selected from the group consisting of chlorine, bromine, methyl, ethyl, methoxy, sulfo, and carboxy, $R_{10}$ has one of the meanings given for $R_9$, W is arylene, alkylene or alkylene-arylene, each unsubstituted or substituted, wherein the alkylene moieties being preferably those of 1 to 6 carbon atoms, preferably of 1 to 4 carbon atoms, in particular of 1 to 3 carbon atoms, such as methylene, ethylene and n-propylene, or being preferably of 2 to 6 carbon atoms, if interrupted by a hetero group, such as O, S, NH, $SO_2$, CO, CO—NH, NH—CO, arylene being preferably phenylene or naphthylene, the substituents of phenylene being preferably 1 or 2 substituents selected from the group consisting of alkyl of 1 to 4 carbon atoms, such as methyl and ethyl, alkoxy of 1 to 4 carbon atoms, such as methoxy and ethoxy, carboxy, sulfo and chlorine, in particular thereof methyl, ethyl, methoxy and ethoxy, and the substituents of naphthylene being preferably 1 or 2 sulfo groups, Y is defined above and, n is the number 1 or 2.

Preference is given to dye mixtures comprising an amount of from 50% to 95% by weight in respect of the disazo dyes(s) of the formula (1) and of from 5% to 50% by weight in respect of the dye(s) of the formula (2).

Special preference is given to dye mixtures comprising an amount of from 60% to 80% by weight in respect of the disazo dyes(s) of the formula (1) and of from 20% to 40% by weight in respect of the dye(s) of the formula (2).

A sulfo group is a group of the formula —$SO_3M$, a sulfato group is a group of the formula —$OSO_3M$, and a thiosulfato group is a group of formula —S—$SO_3M$.

$R_1$ and $R_3$ are each independently of one another preferably hydrogen or methoxy and in particular hydrogen. $R_2$ and $R_4$ are preferably hydrogen. It is especially preferred if $R_1$, $R_2$, $R_3$ and $R_4$ are each hydrogen.

M is preferably hydrogen, lithium, sodium or potassium.

The dyes of the formula (1), and also the dyes of formula (2), in particular if they have the same chromophore, can have, within the meaning of Y, structurally different fiber-reactive groups —$SO_2$—Y. In particular, the dye mixture can contain dyes of the same chromophore conforming to the formula (1) and/or dyes of the same chromophore conforming to formula (2) in which the fiber-reactive groups —$SO_2$—Y are partly vinylsulfonyl groups and partly β-chloroethylsulfonyl or β-thiosulfatoethylsulfonyl or preferably β-sulfatoethylsulfonyl groups. If the dye mixtures contain the respective dye components in the form of a vinylsulfonyl dye, the proportion of the respective vinylsulfonyl dye to the respective β-chloro- or β-thiosulfato- or β-sulfatoethyl-sulfonyl dye will be up to about 30 mol-%, based on the respective dye chromophore. Y is preferably vinyl or β-sulfatoethyl. Preference is here given to the dye mixtures in which the proportion of vinylsulfonyl dye to the β-sulfatoethylsulfonyl dye is in terms of the molar ratio between 5:95 and 30:70.

Preference is given to inventive dye mixtures containing disazo dyes(s) of the formula (1) wherein a is the number 1 and b is the number 0. Preferred dye mixtures of this type comprise one or more disazo dyes conforming to the formula (5) and one or more disazo dyes conforming to the formula (6)

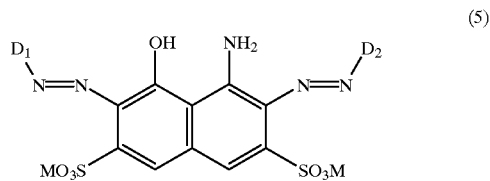

(5)

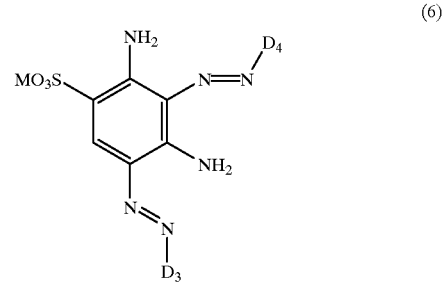

(6)

where M is as defined above and $D_1$, $D_2$, $D_3$, $D_4$ are each independently of the others 3-vinylsulfonylphenyl, 4-vinylsulfonylphenyl, 3-(β-sulfatoethyl-sulfonyl)phenyl or 4-(β-sulfatoethylsulfonyl)phenyl. If vinylsulfonyl as well as β-sulfatoethylsulfonyl groups are present in such dye mixtures the molar ratio between the vinylsulfonyl portions and the β-sulfatoethylsulfonyl portions is in a molar ratio between 5:95 and 30:70.

Preferred dye mixtures of this type comprise furthermore one or more disazo dyes conforming to the formula (5) above and one or more diazo dyes conforming to the formula (6) above where M is as defined above, $D_1$, $D_2$ and $D_4$ are each independently of the others 3-vinylsulfonylphenyl, 4-vinylsulfonylphenyl, 3-(β-sulfatoethyl-sulfonyl)phenyl or 4-(β-sulfatoethylsulfonyl)phenyl and $D_3$ is 2-methoxy-5-(β-sulfatoethylsulfonyl)phenyl or where M is as defined above, $D_1$ and $D_2$ are each independently of the others 3-vinylsulfonylphenyl, 4-vinylsulfonylphenyl, 3-(β-sulfatoethyl-sulfonyl)phenyl or 4-(β-sulfatoethylsulfonyl)phenyl and $D_3$ and $D_4$ are 2-methoxy-5-(β-sulfatoethylsulfonyl)phenyl.

Especially preferred dye mixtures comprise 80 to 90% of a disazo dye of the formula (9) and 10 to 20% of a disazo dye of the formula (10), wherein M is as defined above.

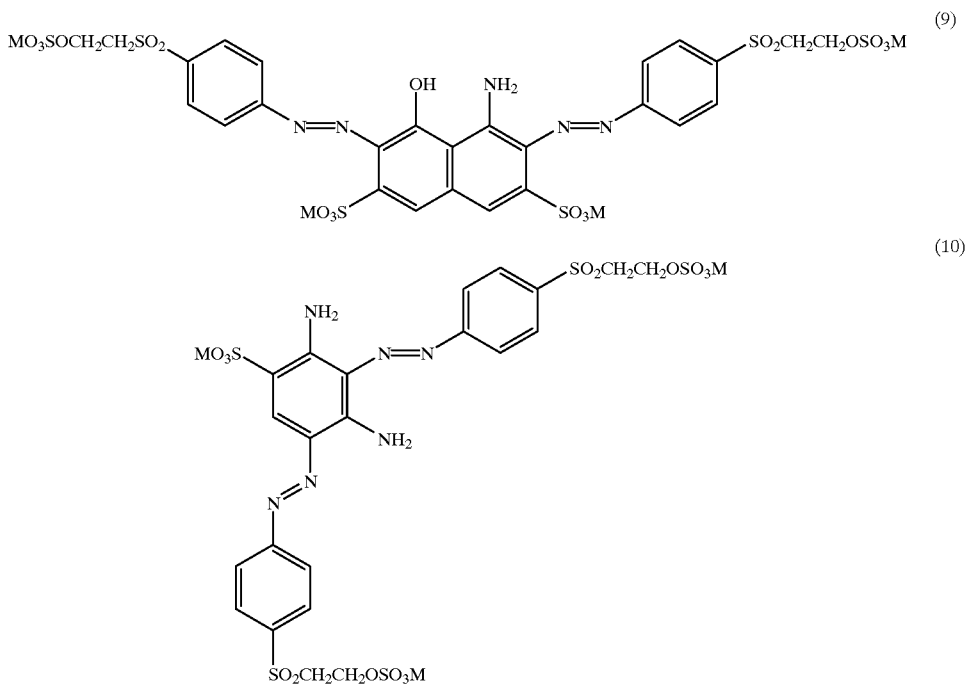

If inventive dye mixtures contain disazo dyes(s) of the formula (1) wherein a is the number 0 and b is the number 1 $Z_2$ is preferably hydrogen and $Z_1$ is preferably a fiber-reactive group of the formulae 3d or 3e.

In the fiber-reactive groups of the formulae 3a and 3b Q is preferably alkoxy of 1 to 4 carbon atoms, most preferably methoxy, or is a compound of formula 4b, most preferably 4-(β-sulfatoethylsulfonyl)aniline.

The dyes of the formulae (1) and (2) are well known from the literature, for example the disazo dyes of the formula (1) from U.S. Pat. No. 2,657,205 and from Japanese Patent Application Publication Sho-58-160 362 and also U.S. Pat. No. 4,257,770 and the references cited therein. Disazo dyes of the formula (2) are described in the Korean Pat. No. 90-4223.

The dye mixtures of the invention can be prepared in solid or liquid (dissolved) form. In solid form they generally contain the electrolyte salts customary in the case of water-soluble and in particular fiber-reactive dyes, such as sodium chloride, potassium chloride and sodium sulfate, and also the assistants customary in commercial dyes, such as buffer substances capable of establishing a pH in aqueous solution between 3 and 7, such as sodium acetate, sodium borate, sodium bicarbonate, sodium dihydrogenphosphate and disodium hydrogenphosphate, small amounts of niccatives or, they are present in liquid, aqueous solution (including the presence of thickeners of the type customary in print pastes), substances which ensure the permanence of these preparations, for example mold preventatives.

In general, the dye mixtures will take the form of dye powders containing 10 to 80% by weight, based on the dye powder or preparation, of a strength-standardizing colorless diluent electrolyte salt. These dye powders may in addition contain the abovementioned buffer substances in a total amount of up to 5%, based on the dye powder. If the dye mixtures of the invention are present in aqueous solution, the total dye content of these aqueous solutions is up to about 50% by weight, the electrolyte salt content of these aqueous solutions preferably being below 10% by weight, based on the aqueous solutions (liquid preparations) can in general contain the abovementioned buffer substances in an amount of up to 5% by weight, preferably up to 2% by weight.

The dye mixtures of the invention can be obtained in a conventional manner, for instance by mechanically mixing the individual dyes in the required proportions or by synthesis by means of the customary diazotization and coupling reactions using appropriate mixtures of the diazo and coupling components in a manner familiar to those skilled in the art and the necessary proportions. One option is for example to prepare aqueous solutions of the two coupling components 1-amino-8-naphthol-3,6-disulfonic acid and 1,3-phenylenediamine-4-sulfonic acid and, as diazo components, of the aniline compounds of the formulae (7a), (7b), (8) and/or (9).

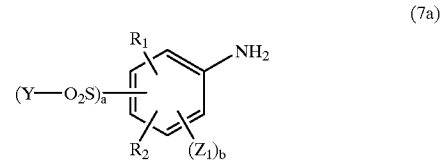

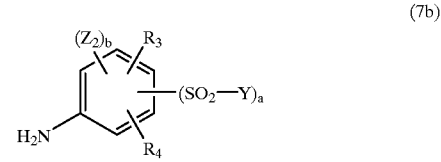

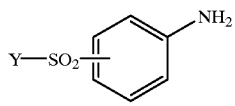

(8)

where $R_1$, $R_2$, $R_3$, $R_4$, $R_5$, $R_6$, $R_7$, $R_8$, $Z_1$, $Z_2$, a, b, and Y are each as defined above, in appropriate proportions, diazotizing these aniline compounds in a conventional manner in a strongly acid medium and then carrying out the coupling reaction of the 1-amino-8-napthol-3, 6-disulfonic acid with one of these diazo components at a pH below 1.5. The second coupling reaction with the monoazo dye product to form the disazo dye conforming to the formula (1) is carried out with a further diazo component at a pH between 3 and 6. Then, by addition of the aqueous solution of 1,3-phenylenediamine-4-sulfonic acid and of a diazo component of either formulae 8 or 9, the coupling reaction to form the disazo dye conforming to the formula (2) is carried out at a pH between 3 and 6. The dye mixture thus obtained can be isolated from the solution by the conventional manner, for example by salting out with an electrolyte salt, such as sodium chloride, potassium chloride or lithium chloride, or by spray-drying.

Dye mixtures in which the dye chromophores contain for example not only a β-chloroethylsulfonyl or β-thiosulfatoethylsulfonyl or β-sulfatoethylsulfonyl group but also proportions with vinylsulfonyl groups cannot only be prepared by the abovementioned method but also using appropriate vinylsulfonyl starting anilines by reacting the dye mixture in which Y is a β-chloroethyl, β-thiosulfatoethyl, or β-sulfatoethyl radical with an amount of alkali required for only part of these groups and converting part said β-substituted ethylsulfonyl groups into vinylsulfonyl groups. This measure is carried out by generally known methods of converting β-substituted ethylsulfonyl groups into the vinylsulfonyl group.

The novel mixtures of the dyes of the formulae (1) and (2) dye hydroxy- and/or carboxamido-containing fiber materials by the application and fixing methods numerously described in the art for fiber-reactive dyes in deep navy-blue shades with good color build-up and good wash-off in respect of unfixed dye portions. Moreover, the dyeings obtained are readily dischargeable.

The present invention therefore also provides for use of the novel dye mixtures for dyeing and printing hydroxy- and/or carboxamido-containing fiber materials and processes for dyeing and printing such fiber materials and processes for dyeing and printing such materials using a dye mixture according to the invention by applying the dye mixture to the substrate in dissolved form and fixing the dyes on the fiber by the action of an alkali or by heating or both.

Hydroxy-containing materials are natural or synthetic hydroxy-containing materials, for example cellulose fiber materials, including in the form of paper, or their regenerated products and polyvinyl alcohols.

Cellulose fiber materials are preferably cotton but can also be other vegetable fibers, such as linen, hemp, jute, and ramie fibers. Regenerated cellulose fibers are for example staple viscose and filament viscose.

Carboxamido-containing materials are for example synthetic and natural polyamides and polyurethanes, in particular in the form of fibers, for example wool and other animal hairs, silk, leather, nylon-6,6, nylon-6, nylon-11, and nylon-4.

Application of the dye mixtures of the invention is by generally known processes for dyeing and printing fiber materials by the known application techniques for fiber-reactive dyes. Since the dyes of the dye mixtures according to the invention are highly compatible with one another, the dye mixtures of the invention are also advantageously useful in exhaust dyeing processes. Applied in this way for example to cellulose fibers from a long liquor ratio at temperatures between 40° and 105° C., optionally at temperatures up to 130° C., under superatmospheric pressure, and optionally in the presence of customary dyeing assistants with the use of acid-binding agents and optionally neutral salts, such as sodium chloride or sodium sulfate, they produce dyeings in very good color yields with excellent color build-up and consistent shade. One possible procedure is to introduce the material into the warm bath, gradually heat the bath to the desired dyeing temperature, and complete the dyeing process at that temperature. The neutral salts which speed up the exhaustion of the dyes can also if desired not be added to the bath until the actual dyeing temperature has been reached.

Similarly, the conventional printing processes for cellulose fibers—which can either be carried out in single-phase, for example by printing with a print paste containing sodium bicarbonate or some other acid-binding agent and the colorant, and subsequent steaming at from 100° to 103° C., or in two phases, for example by printing with a neutral or weakly acid print paste containing the colorant and subsequent fixation either by passing the printed material through a hot electrolyte-containing alkaline bath or by overpadding with an alkaline electrolyte-containing padding liquour and subsequent batching of this treated material or subsequent steaming or subsequent treatment with dry heat to produce strong prints with well defined contours and a clear white ground. Changing fixing conditions has only little effect on the outcome of the prints. Not only in dyeing but also in printing the degrees of fixation obtained with dye mixtures of the invention are very high. The hot air used in dry heat fixing by the customary thermofix processes has a temperature of from 120° to 200° C. In addition to the customary steam at from 101° to 103° C., it is also possible to use superheated steam and high pressure steam at up to 160° C.

Acid-binding agents responsible for fixing the dyes to cellulose fibers are for example water-soluble basic salts of alkali metals and of alkaline earth metals of inorganic or organic acids, and compounds which release alkali when hot. Of particular suitability are the alkali metal hydroxides and alkali metal salts of weak to medium inorganic or organic acids, the preferred alkali metal compounds being the sodium and potassium compounds. These acid-binding agents are for example sodium hydroxide, potassium hydroxide, sodium carbonate, sodium bicarbonate, potassium carbonate, sodium formate, sodium dihydrogenphosphate and disodium hydrogenphosphate.

Treating the dyes of the dye mixtures according to the invention with the acid-binding agents with or without heating bonds the dyes chemically to the cellulose fiber. Especially the dyeings on cellulose, after they have been given the usual aftertreatment of rinsing to remove unfixed dye portions, show excellent wet fastness properties, in particular since the unfixed dye portions are readily washed off because of their good cold water solubility.

The dyeings of polyurethane and polyamide fibers are customarily carried out from an acid medium. The dyebath may contain for example acetic acid and/or ammonium sulfate and/or acetic acid and ammonium acetate or sodium acetate to bring it to the desired pH. To obtain a dyeing of acceptable levelness it is advisable to add customary leveling assistants, for example based on a reaction product of cyanuric chloride with three times the molar amount of an aminobenzenesulfonic acid or aminonaphthalenesulfonic acid or based on a reaction product of for example stearylamine with ethylene oxide. In general the material to be dyed is introduced into the bath at a temperature of about 40° C. and agitated therein for some time, the dyebath is then adjusted to the desired weakly acid, preferably weakly acetic acid, pH, and the actual dyeing is carried out at temperature between 60° and 98° C. However, the dyeings can also be carried out at the boil or at temperatures up 120° C. under superatmospheric pressure.

The examples which follow illustrate the invention. Parts and percentages are by weight, unless otherwise stated. The parts by weight bear the same relation to parts by volume as the kilogram to the liter.

EXAMPLE 1

300 parts of an electrolyte-containing dye powder which contains the navy-dyeing disazo dye of the formula (A)

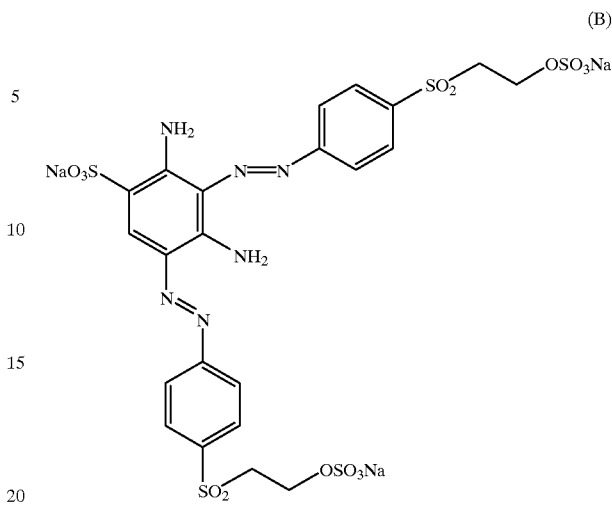

(B)

The resulting dye mixture according to the invention, when employed according to the application and fixing methods customary in the art for fiber-reactive dyes, produces for example on cellulose fiber materials dyeings and prints in greenish-tinged navy-blue shades.

EXAMPLE 2

A dye mixture according to the invention is prepared by diazotizing a suspension of 281 parts of 4-(β-sulfatoethylsulfonyl)aniline in 650 parts of ice-water and 180 parts of 30% aqueous hydrochloric acid with 173 parts of 40% strength aqueous sodium nitrite solution. 136 parts of 1-amino-8-napthol-3,6-disulfonic acid is added and the first coupling is carried out at a pH between 1 and 1.3 and at a temperature below 20° C. (the pH is maintained with about 50 parts of sodium bicarbonate). Then 14 parts of 1,3-phenylenediamine-4-sulfonic acid is added and the pH is slowly raised to a pH of from 5 to 6 with sodium carbonate, and carrying out the coupling reaction at 20° C. and within that pH range.

The result is a greenish-tinged, navy-blue dye solution containing the dyes of formulae (A) and (B) mentioned in Example 1 in the ratio of 85%:15%.

This dye solution can be adjusted to pH 4.5 by adding 5 parts of a sodium phosphate buffer. By further diluting with

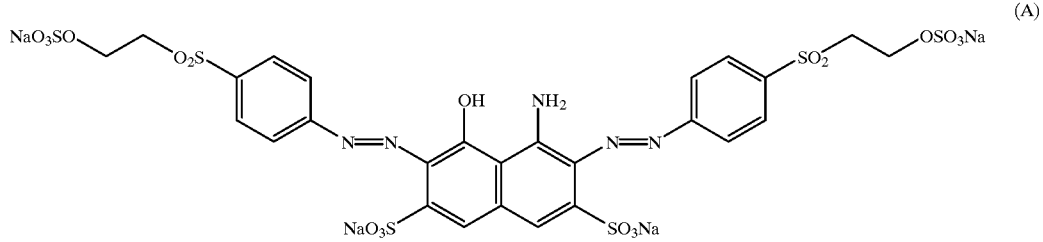

(A)

in a proportion of 50% are mechanically mixed with 67 parts of an electrolyte-containing dye powder which contains the golden yellow-dyeing disazo of the formula (B) in a 75% proportion.

water or by evaporating the solution, this liquid dye mixture can then be standardized to the desired strength for a liquid preparation. The dye mixture affords greenish-tinged, navy-blue shades on cellulose.

EXAMPLE 2a

The method described in Example 2 can be used to prepare a similar dye mixture by varying the amount used of starting compounds, for example the amount of 1-amino-8-naphthol-3,6-disulfonic acid in an amount of 128 parts and the 1,3-phenylenediamine-4-sulfonic acid in an amount of 18.8 parts. The result obtained is a dye mixture in which the dyes of formulae (A) and (B) are present in the ratio of about 80%:20%. The dye mixture can be isolated from the synthesis solution, for example by spray drying, or else be used directly as a liquid for dyeing. Employed according to the application and fixing methods customary in the art for fiber-reactive dyes, produces for example on cellulose fiber materials dyeings and prints in greenish-tinged, navy-blue shades.

EXAMPLE 2b

The method described in Example 2 can be used to prepare a similar dye mixture by varying the amount used of starting compounds, for example the amount of 1-amino-8-naphthol-3,6-disulfonic acid in an amount of 144 parts and the 1,3-phenylenediamine-4-sulfonic acid in an amount of 9.4 parts. The result obtained is a dye mixture in which the dyes of formulae (A) and (B) are present in the ratio of about 90%:10%. The dye mixture can be isolated from the synthesis solution, for example by spray drying, or else be used directly as a liquid for dyeing. Employed according to the application and fixing methods customary in the art for fiber-reactive dyes, produces for example on cellulose fiber materials dyeings and prints in greenish-tinged, navy-blue shades.

EXAMPLE 3

To prepare a dye mixture in which some of the dyes have β-sulfatoethylsulfonyl group while the rest has as vinylsulfonyl group, the solution of the novel dye mixture prepared in Example 2 is used as the starting point. 25% by volume of this solution is separated offf, adjusted with sodium carbonate to pH 8–10 and subsequently stirred at 30–40° C. for a further 30 minutes, in the course of which the β-sulfatoethylsulfonyl groups are transformed into vinylsulfonyl groups. Thereafter sulfuric acid is used to lower the pH to 4.0–5.0 and this solution of the vinylsulfonyl dye mixture is added to the original solution of the β-sulfatoethylsulfonyl dye mixture. The result is an aqueous solution of dyes conforming to the formulae (A-1) and (B-1)

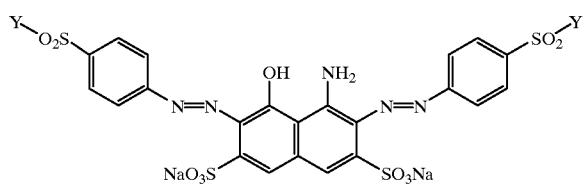

(A-1)

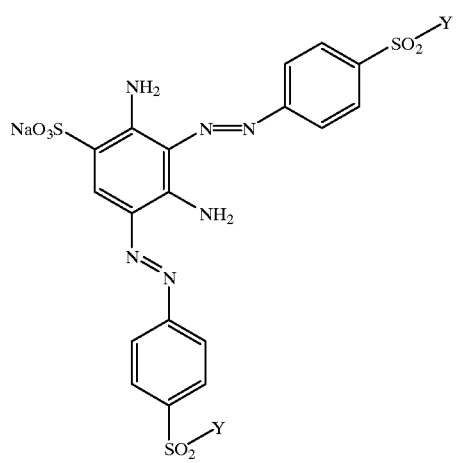

(B-1)

where Y is 25% vinyl and 75% β-sulfatoethyl.

The filtrate is adjusted with 5 parts of sodium phosphate buffer to a pH of 4.5. By adding or evaporating water, this aqueous solution can be adjusted to the strength desired for a liquid preparation and be used directly for dyeing. When the customary application and fixing methods in the art for fiber-reactive dyes are employed greenish-tinged navy-blue shades are produced.

EXAMPLE 4

A dye mixture according to the invention is prepared by diazotizing a suspension of 169 parts of 4-(β-sulfatoethylsulfonyl)aniline in 450 parts of ice-water and 110 parts of 30% aqueous hydrochloric acid with 104 parts of 40% strength aqueous sodium nitrite solution. 127.6 parts of 1-amino-8-napthol-3,6-disulfonic acid and 18.8 parts of 1,3-phenylenediamine-4-sulfonic acid are added and the coupling is carried out at a pH between 1 and 1.3 and at a temperature below 20° C. (the pH is maintained with about 30 parts of sodium bicarbonate). When complete, the pH is raised to 5–6 with 20 parts sodium carbonate to afford a red monoazo dye and a yellow disazo dye of formula (B). Separately 125 parts 2-methoxy-5-(β-sulfatoethylsulfonyl) aniline in 400 parts of ice-water and 72 parts of 30% hydrochloric acid is diazotized with 69 parts of 40% strength aqueous sodium nitrite solution. This diazo suspension is then added to the above red monoazo and yellow disazo dye suspension at pH 5–(maintaining pH with 20 parts sodium carbonate).

The result is a greenish-tinged, navy-blue dye solution containing the dyes of formulae (C) and (B) in the ratio of 80%:20%.

This dye solution can be adjusted to pH 4.5 by adding 5 parts of a sodium phosphate buffer. By further diluting with water or by evaporating the solution, this liquid dye mixture can then be standardized to the desired strength for a liquid preparation. The dye mixture affords greenish-tinged navy-blue shades on cellulose.

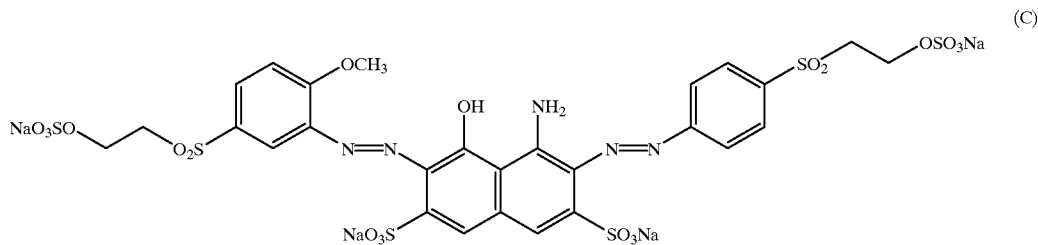

(C)

EXAMPLE 4a

The method described in Example 4 can be used to prepare a similar dye mixture by varying the amount used of starting compounds, for example the amount of 1-amino-8-naphthol-3,6-disulfonic acid in an amount of 144 parts, the 1,3-phenylenediamine-4-sulfonic acid in an amount of 9.4 parts, the 4-(β-sulfatoethylsulfonyl)aniline in an amount of 127 parts, and the 2-methoxy-5-(β-sulfatoethylsulfonyl) aniline in an amount of 140 parts. The result obtained is a dye mixture in which the dyes of formulae (C) and (B) are cresent in the ratio of about 90%:10%. The dye mixture can be isolated from the synthesis solution, for example by spray drying, or else be used directly as a liquid for dyeing. Employed according to the application and fixing methods customary in the art for fiber-reactive dyes, produces for example on cellulose fiber materials dyeings and prints in greenish-tinged navy-blue shades.

EXAMPLE 5

A dye mixture according to the invention is prepared by diazotizing a suspension of 169 parts of 4-(β-sulfatoethylsulfonyl)aniline in 450 parts of ice-water and 110 parts of 30% aqueous hydrochloric acid with 104 parts of 40% strength aqueous sodium nitrite solution. 127.6 parts of 1-amino-8-napthol-3,6-disulfonic acid and 18.8 parts of 1,3-phenylenediamine-4-sulfonic acid are added and the coupling is carried out at a pH between 1 and 1.3 and at a temperature below 20° C. (the pH is maintained with about 30 parts of sodium bicarbonate). When complete, the pH is raised to 5–6 with 20 parts sodium carbonate to afford a red monoazo dye and a yellow disazo dye of formula (B). Separately 130 parts 2-methoxy-5-methyl-4-(β-sulfatoethylsulfonyl)aniline in 400 parts of ice-water and 72 parts of 30% hydrochloric acid is diazotized with 69 parts of 40% strength aqueous sodium nitrite solution. This diazo suspension is then added to above the red monoazo and yellow disazo dye suspension at pH 5–6 (maintaining pH with 20 parts sodium carbonate).

The result is a greenish-tinged navy-blue dye solution containing the dyes of formulae (D) and (B) in the ratio of 80%:20%.

This dye solution can be adjusted to pH 4.5 by adding 5 parts of a sodium phosphate buffer. By further diluting with water or by evaporating the solution, this liquid dye mixture can then be standardized to the desired strength for a liquid preparation. The dye mixture affords greenish-tinged navy-blue shades on cellulose.

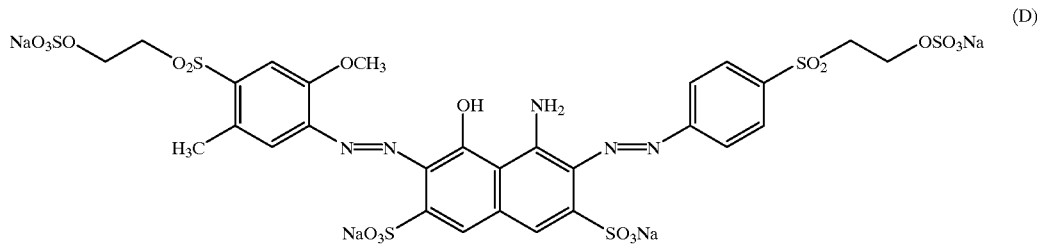

(D)

EXAMPLE 6

A dye mixture according to the invention is prepared by diazotizing a suspension 169 parts of 4-(β-sulfatoethylsulfonyl)aniline in 450 parts of ice-water and 110 parts of 30% aqueous hydrochloric acid with 104 parts of 40% strength aqueous sodium nitrite solution. 127.6 parts of 1-amino-8-napthol-3,6-disulfonic acid and 18.8 parts of 1,3-phenylenediamine-4-sulfonic acid are added and the coupling is carried out at a pH between 1 and 1.3 and at a temperature below 20° C. (the pH is maintained with about 30 parts of sodium bicarbonate). When complete, the pH is raised to 5–6 with 20 parts sodium carbonate to afford a red monoazo dye and a yellow disazo dye of formula (B). Separately 130 parts 2,5-dimethoxy-4-(β-sulfatoethylsulfonyl)aniline in 400 parts of ice-water and 72 parts of 30% hydrochloric acid is diazotized with 69 parts of 40% strength aqueous sodium nitrite solution. This diazo suspension is then added to above the red monoazo and yellow disazo dye suspension at pH 5–6 (maintaining pH with 20 parts sodium carbonate).

The result is a greenish-tinged, navy-blue dye solution containing the dyes of formulae (E) and (B) in the ratio of 80%:20%.

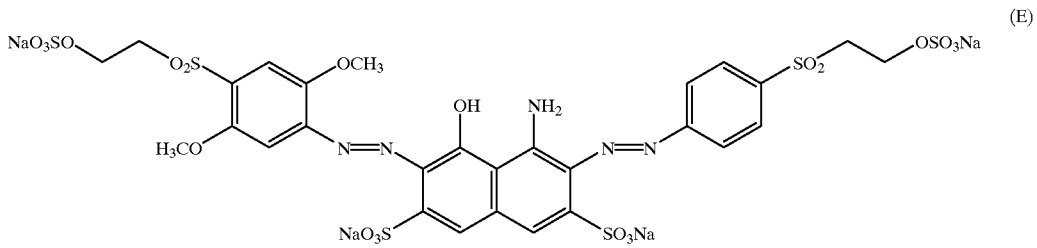

(E)

This dye solution can be adjusted to pH 4.5 by adding 5 parts of a sodium phosphate buffer. By further diluting with water or by evaporating the solution, this liquid dye mixture can then be standardized to the desired strength for a liquid preparation. The dye mixture affords greenish-tinged navy-blue shades on cellulose.

EXAMPLE 7

A dye mixture according to the invention is prepared by diazotizing a suspension 225 parts of 4-(β-sulfatoethylsulfonyl)aniline in 650 parts of ice-water and 150 parts of 30% aqueous hydrochloric acid with 138 parts of 40% strength aqueous sodium nitrite solution. 128 parts of 1-amino-8-napthol-3,6-disulfonic acid is added and the first coupling is carried out at a pH between 1 and 1.3 and at a temperature below 20° C. (the pH is maintained with about 50 parts of sodium bicarbonate), then the pH is slowly raised to a pH of from 5 to 6 with sodium carbonate, and carrying out the coupling reaction at 20° C. and within that pH range to afford a dye solution of formula (A).

In a separate batch, a suspension of 56 parts of 3-(β-sulfatoethylsulfonyl)-aniline in 200 parts ice-water and 36 parts of 30% hydrochloric acid is diazotized with 35 parts of a 40% aqueous sodium nitrite solution. 18.8 parts of 1,3-phenylenediamine-4-sulfonic acid is added and the pH is raised to 5–6 with 30 parts of sodium carbonate, and carrying out the coupling reaction at 20° C. and within that pH range to afford a dye solution of formula (F).

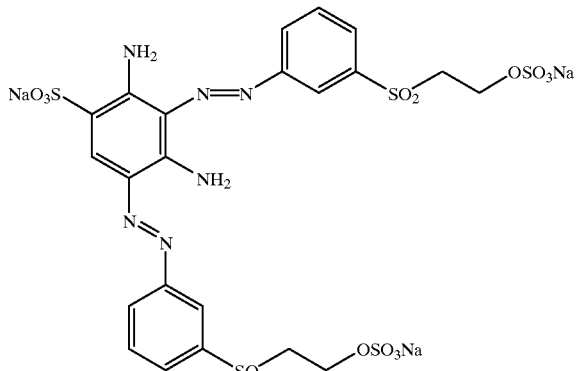

(F)

Dye solutions of the formulae (A) and (F) are mixed together to afford a greenish-tinged navy-blue dye solution containing the dyes in the ratio of 80%:20%.

This dye solution can be adjusted to pH 4.5 by adding 5 parts of a sodium phosphate buffer. By further diluting with water or by evaporating the solution, this liquid dye mixture can then be standardized to the desired strength for a liquid preparation. The dye mixture affords greenish-tinged navy-blue shades on cellulose.

EXAMPLES 8–20

The table examples which follow describe further novel dye mixtures of the dyes conforming to the formulae (5) and (6)

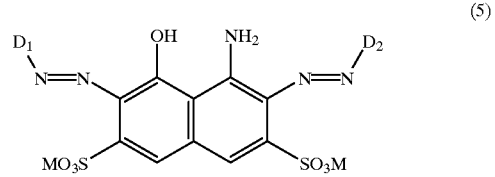

(5)

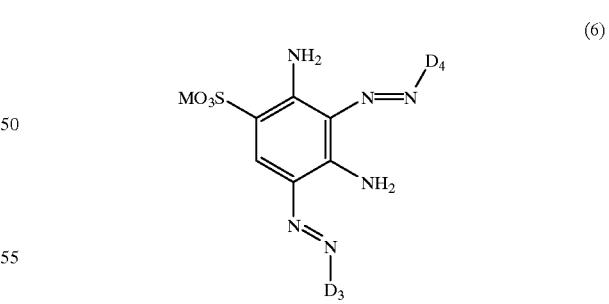

(6)

in terms of the components of these dyes (M has one of the abovementioned meanings). In the mixing ratio according to the invention and when employed according to the application and fixing methods customary in the art for fiber-reactive dyes these dye mixtures to produce for example on cellulose fiber materials greenish-tinged navy-blue dyeings.

Dye mixtures of Disazo dyes (5) and (6)
| Example | Radical D₁ | Radical D₂ | Radical D₃ | Radical D₄ |
|---|---|---|---|---|
| 10 | 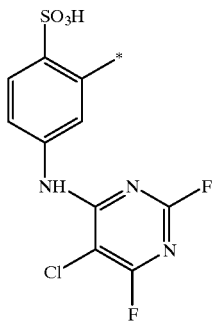 | 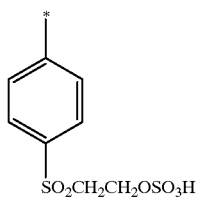 | ditto D₂ | ditto D₂ |
| 11 | 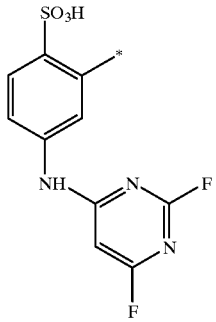 | 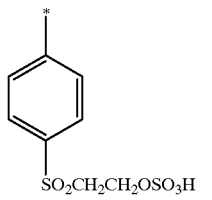 | ditto D₂ | ditto D₂ |
| 12 | 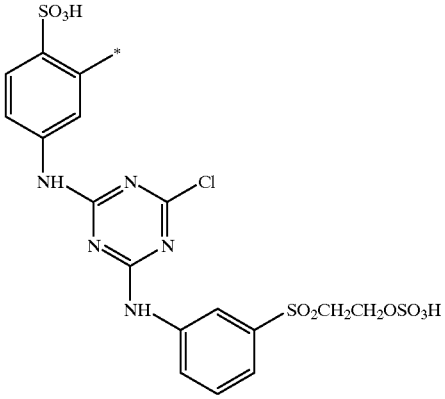 | 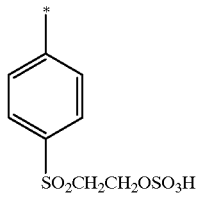 | ditto D₂ | ditto D₂ |
| 13 | 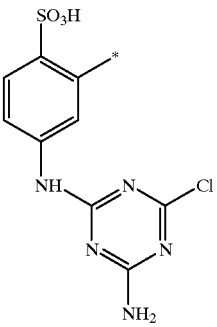 | 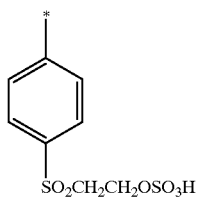 | ditto D₂ | ditto D₂ |

-continued

Dye mixtures of Disazo dyes (5) and (6)

| Example | Radical D$_1$ | Radical D$_2$ | Radical D$_3$ | Radical D$_4$ |
|---|---|---|---|---|
| 14 | 4-SO$_3$H-phenyl substituted at position 3 with NH-[triazine with F and NH-(3-SO$_2$CH$_2$CH$_2$OSO$_3$H-phenyl)] | 4-SO$_2$CH$_2$CH$_2$OSO$_3$H-phenyl | ditto D$_2$ | ditto D$_2$ |
| 15 | 4-SO$_3$H-phenyl substituted at position 3 with NH-[triazine with Cl and OCH$_3$] | 4-SO$_2$CH$_2$CH$_2$OSO$_3$H-phenyl | ditto D$_2$ | ditto D$_2$ |
| 16 | 2-SO$_3$H-4-SO$_2$CH$_2$CH$_2$OSO$_3$H-phenyl | 4-SO$_2$CH$_2$CH$_2$OSO$_3$H-phenyl | ditto D$_2$ | ditto D$_2$ |
| 17 | 2-SO$_3$H-4-SO$_2$CH$_2$CH$_2$OSO$_3$H-phenyl | 4-SO$_2$CH$_2$CH$_2$OSO$_3$H-phenyl | 3-SO$_2$CH$_2$CH$_2$OSO$_3$H-phenyl | ditto D$_3$ |
| 18 | 2-CO$_2$H-4-SO$_2$CH$_2$CH$_2$OSO$_3$H-phenyl | 4-SO$_2$CH$_2$CH$_2$OSO$_3$H-phenyl | ditto D$_2$ | ditto D$_2$ |

-continued
| | Dye mixtures of Disazo dyes (5) and (6) | | | |
|---|---|---|---|---|
| Example | Radical $D_1$ | Radical $D_2$ | Radical $D_3$ | Radical $D_4$ |
| 19 | 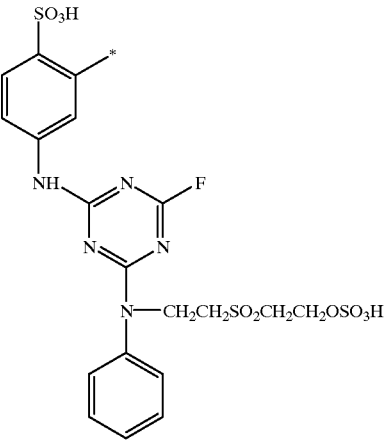 | 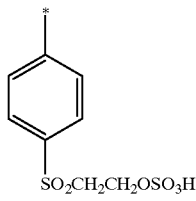 | ditto $D_2$ | ditto $D_2$ |
| 20 | 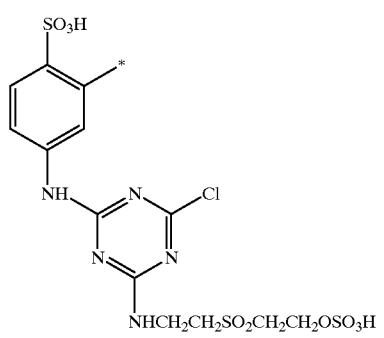 | 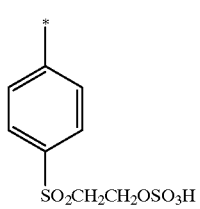 | ditto $D_2$ | ditto $D_2$ |
| 21 | 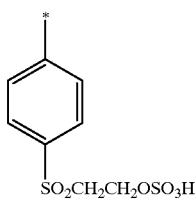 | ditto $D_1$ | 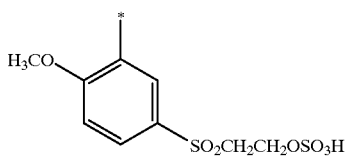 | ditto $D_1$ |

-continued

| | Dye mixtures of Disazo dyes (5) and (6) | | | |
|---|---|---|---|---|
| Example | Radical $D_1$ | Radical $D_2$ | Radical $D_3$ | Radical $D_4$ |
| 22 | 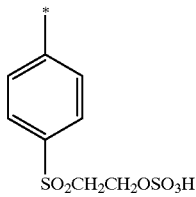 4-($SO_2CH_2CH_2OSO_3H$)-phenyl | ditto $D_1$ | 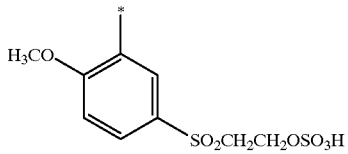 4-$H_3CO$, $SO_2CH_2CH_2OSO_3H$-phenyl | ditto $D_3$ |
| 23 | 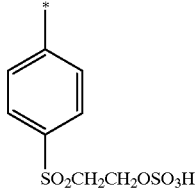 4-($SO_2CH_2CH_2OSO_3H$)-phenyl | ditto $D_1$ | 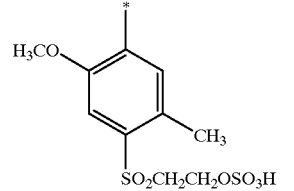 $H_3CO$, $CH_3$, $SO_2CH_2CH_2OSO_3H$ substituted phenyl | ditto $D_1$ |
| 24 | 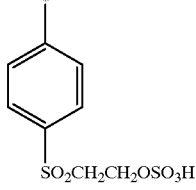 4-($SO_2CH_2CH_2OSO_3H$)-phenyl | ditto $D_1$ |  $H_3CO$, $CH_3$, $SO_2CH_2CH_2OSO_3H$ substituted phenyl | ditto $D_3$ |
| 25 | 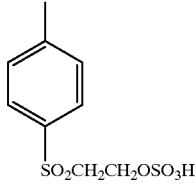 4-($SO_2CH_2CH_2OSO_3H$)-phenyl | ditto $D_1$ | 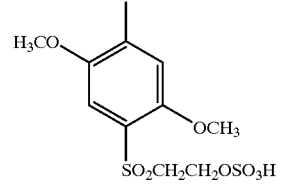 $H_3CO$, $OCH_3$, $SO_2CH_2CH_2OSO_3H$ substituted phenyl | ditto $D_1$ |
| 26 | 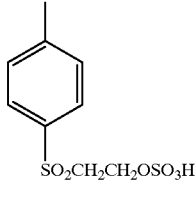 4-($SO_2CH_2CH_2OSO_3H$)-phenyl | ditto $D_1$ | 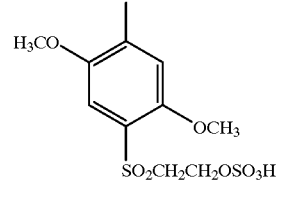 $H_3CO$, $OCH_3$, $SO_2CH_2CH_2OSO_3H$ substituted phenyl | ditto $D_3$ |
| 27 | 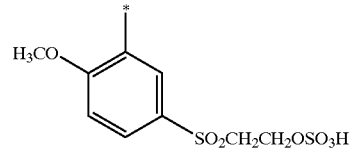 $H_3CO$, $SO_2CH_2CH_2OSO_3H$ substituted phenyl | 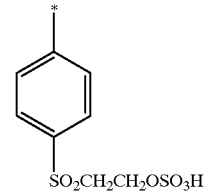 4-($SO_2CH_2CH_2OSO_3H$)-phenyl | ditto $D_1$ | ditto $D_1$ |

-continued

Dye mixtures of Disazo dyes (5) and (6)

| Example | Radical $D_1$ | Radical $D_2$ | Radical $D_3$ | Radical $D_4$ |
|---|---|---|---|---|
| 28 | 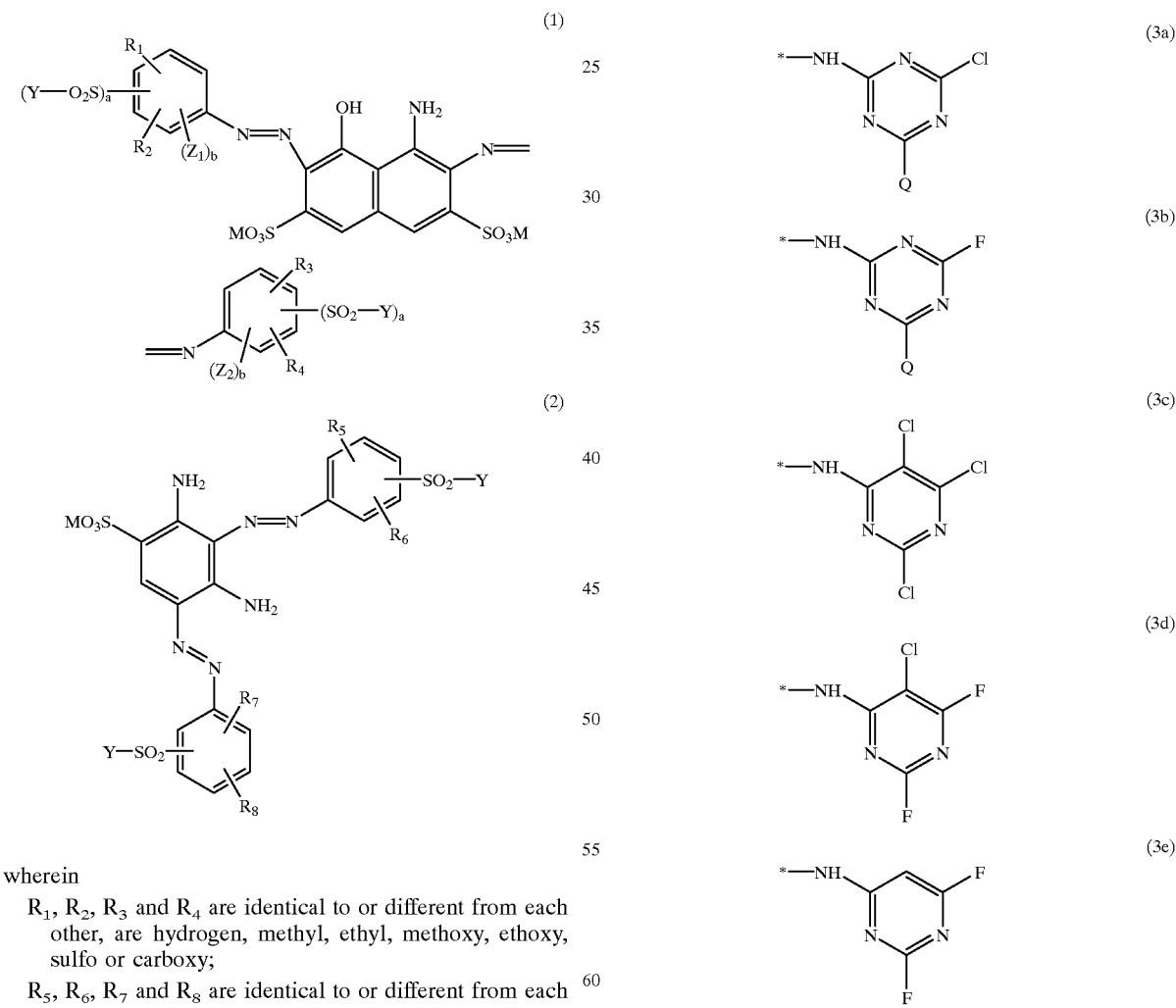 | | ditto $D_1$ | ditto $D_1$ |

What is claimed is:

1. A dye mixture comprising one or more dyes conforming to the formula (1) and one or more dyes conforming to the formula (2)

wherein
- $R_1$, $R_2$, $R_3$ and $R_4$ are identical to or different from each other, are hydrogen, methyl, ethyl, methoxy, ethoxy, sulfo or carboxy;
- $R_5$, $R_6$, $R_7$ and $R_8$ are identical to or different from each other, are hydrogen, methyl, ethyl, methoxy or ethoxy;
- Y is in each instance independently of the others vinyl, β-chloroethyl, β-thiosulfatoethyl or β-sulfatoethyl;
- a is the number 0 or 1;
- b is identical or different and is the number 0 or 1 with the proviso that at least one b is 1;
- M is hydrogen or an alkali metal,
- $Z_1$ and $Z_2$ are independently selected from the fiber-reactive groups of the formulae (3a) (3b), (3c), (3d), and (3e)

where Q is chloro, cyanamido, hydroxy, alkoxy of 1 to 4 carbon atoms, phenoxy, sulfophenoxy, pyridino, carboxypyridino, carbamoylpyridino or a group of the general formula (4a) or (4b),

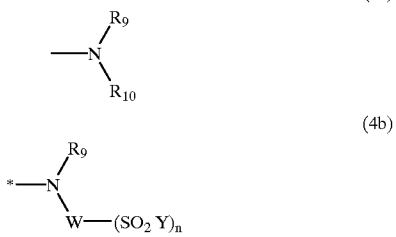

wherein

R$_9$ is hydrogen, alkyl of 1 to 4 carbon atoms, cyclohexyl, alkoxy of 1 to 4 carbon atoms, hydroxyalkyl of 2 to 4 carbon atoms, sulfoalkyl of 1 to 4 carbon atoms, phenyl unsubstituted or substituted by 1 to 2 substituents selected from the group of substituents consisting of chlorine, bromine, methyl, ethyl, methoxy, sulfo and carboxy, or is monosulfonaphthyl, disulfonaphthyl, alkyl of 2 to 6 carbon atoms substituted by phenyl, the alkyl moiety may be interrupted by a hetero group selected from O, S, NH, SO$_2$, CO, CO—NH or NH—CO, and the phenyl substituent thereof may be substituted by 1 to 2 substituents selected from the group consisting of chlorine, bromine, methyl, ethyl, methoxy, sulfo, and carboxy, R$_{10}$ has one of the meanings given for R$_9$, W is arylene, alkylene or alkylene-arylene, each unsubstituted or substituted, or being of 2 to 6 carbon atoms, if interrupted by a hetero group, Y is defined above and, n is the number 1 or 2 and the proviso that the dye of the formula (I) contains exactly two reactive groups selected from SO$_2$Y, Z$_1$ and Z$_2$, wherein one of said reactive groups is on each phenyl substituent.

2. The dye mixture of claim 1, wherein the one or more disazo dyes conforming to the formula (1) account for from 50 to 95% by weight and the one or more monoazo dyes conforming to the formula (2) account for from 5 to 50% by weight.

3. The dye mixture of claim 1, wherein the one or more disazo dyes conforming to the formula (1) account for from 60 to 80% by weight and the one or more monoazo dyes conforming to the formula (2) account for from 40 to 20% by weight.

4. The dye mixture of claim 1, wherein the R$_1$ and R$_3$ are each independently of one another hydrogen or methoxy and R$_2$ and R$_4$ are each hydrogen.

5. The dye mixture of claim 1, wherein R$_1$, R$_2$, R$_3$, and R$_4$ are each hydrogen.

6. The dye mixture of claim 1, wherein Y is in each instance independently of the others vinyl or β-sulfatoethyl.

7. A method for preparing the dye mixture of claim 1 comprising mechanically mixing the individual dyes in the required proportions or synthesizing the dye mixture by means of diazotization and coupling reactions using mixtures of the diazo and coupling components.

8. A method for dyeing or printing hydroxy- and/or carboxamido-containing fiber materials comprising the step of dyeing or printing said materials with a dye mixture as claimed in claim 1.

9. The dye mixture as claimed in claim 1, wherein W is an arylene, alkylene-arylene or an alkylene moiety containing one to six carbon atoms, or being of 2 to 6 carbon atoms, if it interrupted by a hetero group which is selected from the group consisting of O, S, NH, SO$_2$, CO, CO—NH and NH—CO.

10. The dye mixture as claimed in claim 9, wherein W is an alkylene moiety of 1 to 4 carbon atoms or being of 2 to 6 carbon atoms if interrupted by a hetero group which is selected from the group consisting of O, S, NH, SO$_2$, CO, CO—NH and NH—CO; or phenylene or naphthylene, the substituents of phenylene being 1 or 2 substituents selected from the group consisting of alkyl of 1 to 4 carbon atoms, alkoxy of 1 to 4 carbon atoms, carboxy, sulfo and chlorine and the substituents of naphthylene being 1 to 2 sulfo groups.

11. The dye mixture as claimed in claim 10, wherein W is an alkaline moiety of 1 to 3 carbon atoms or being of 2 to 6 carbon atoms if interrupted by a hetero group selected from the group consisting of O, S, NH, SO$_2$, CO, CO—NH and NH—CO; or phenylene or naphthylene, the substituents of the phenylene being 1 or 2 substituents selected from the group consisting of methyl, ethyl, methoxy, ethoxy, carboxy, sulfo and chlorine and the substituents of naphthylene being 1 or 2 sulfo groups.

12. The dye mixture as claimed in claim 11, wherein W is methylene, ethylene, n-propylene, phenylene or naphthylene, the substituents of phenylene being 1 or 2 substituents selected from the group consisting of methyl, ethyl, methoxy and ethoxy, and the substituents of naphthylene being 1 or 2 sulfo groups.

* * * * *